No. 878,753. PATENTED DEC. 17, 1907.
J. C. JACOBY.
NOSE RING.
APPLICATION FILED MAR. 19, 1907.

WITNESSES:
E. J. Stewart
A. P. Hollingsworth

John C. Jacoby,
INVENTOR.
By C. A. Snow & Co.
ATTORNEYS

UNITED STATES PATENT OFFICE.

JOHN C. JACOBY, OF ASHLAND, OHIO.

NOSE-RING.

No. 873,753.  Specification of Letters Patent.  Patented Dec. 17, 1907.

Application filed March 19, 1907. Serial No. 363,193.

*To all whom it may concern:*

Be it known that I, JOHN C. JACOBY, a citizen of the United States, residing at Ashland, in the county of Ashland and State of Ohio, have invented a new and useful Nose-Ring, of which the following is a specification.

This invention relates to an article known as a nose ring, an article applied to the noses of swine to prevent them from rooting the ground and to restrain them from fighting among themselves.

The principal object of the invention is to provide a simple, adequate and easily applied device to be fastened to the nose of swine, which will retain its position in the nose and present such an unyielding vertical and horizontal guard in front of the nose as will effectually prevent the animal from rooting.

Figure 1:
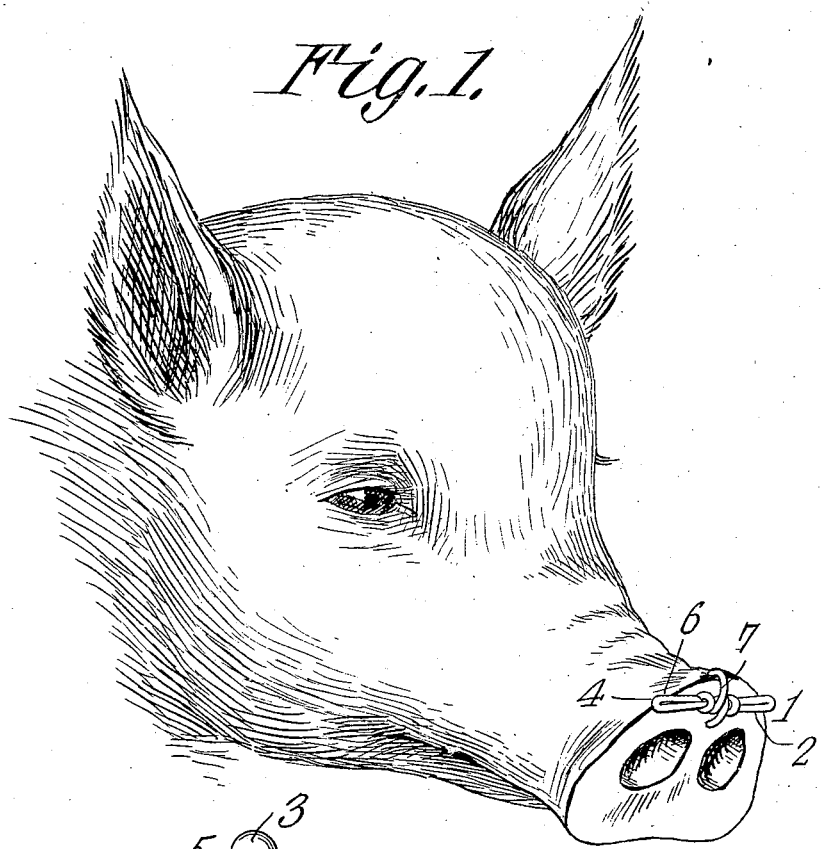
Figure 2:
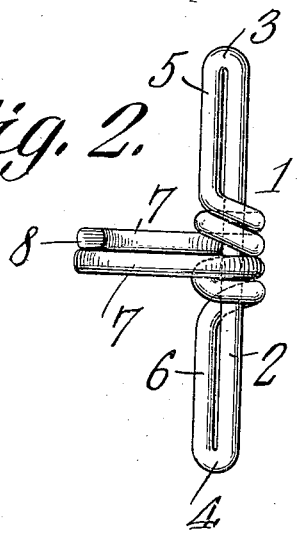
Figure 3:
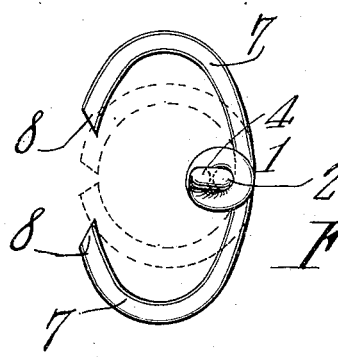

To present the invention in a more detailed manner, attention is directed to the description and claims, and to the accompanying drawings, in which:

Figure 1 is a view of the head of an animal with the invention applied thereto. Figs. 2 and 3 are, respectively, a plan and side view of the device detached from the animal.

Similar numerals of reference indicate corresponding parts throughout the several figures of the drawings.

The nose ring indicated as a whole by the numeral 1, is made by choice, of a single piece of wire of suitable gage bent and twisted upon itself until it assumes the desired form illustrated in the several figures of the drawings. It comprises a horizontally disposed front bar 2 preferably straight having looped ends 3 and 4 formed by bending the wire rearwardly upon itself to produce strengthening braces 5 and 6 which extend from the looped ends toward the center of the bar 2 and substantially parallel therewith. As the ends of the wire approach each other, they are given several turns in opposite directions around the front bar 2, until they meet at its center from whence, they extend at right angles to the bar 2 in opposite directions for a short distance and then terminate each in a hook 7 curving rearwardly, their sharp pointed ends 8 separated a sufficient distance to permit the device being attached to the nose of an animal.

In applying the nose ring, the hooks 7 are grasped by a suitable tool and one of the pointed ends 8 placed in front of the nose between the nostrils and the other above the nose. Now, by properly manipulating the tool, the hooks 8 are pressed together, as illustrated in dotted lines in Fig. 3, causing the pointed ends 8 to penetrate the end of the nose and remain therein. The ring is applied in such manner that the front bar 1 will assume a substantially horizontal position and form such an effectual barrier against rooting, that but one of the rings of the present invention will be necessary where several of the kind now in use are employed.

While the front bar 1 is shown as straight, it may be curved rearwardly or even forwardly without departing from the spirit of the invention; and instead of making the nose ring of wire it may be made of malleable iron, sheet metal, or other condition of metal.

Having thus described the invention what is claimed is:—

1. A nose ring comprising a horizontally disposed bar, and a hook formed at the longitudinal center of said bar projecting above it and a similar hook extending below it, said hooks being in a plane perpendicular to said bar.

2. A nose ring comprising a bar and two curved and pointed hooks at the center thereof extending in opposite directions therefrom and disposed approximately in the same plane at a right angle to said bar.

3. A nose ring constructed of a single piece of wire comprising a straight front bar and a rear strengthening brace at each end connected to said bar by a loop, said braces being wound about the center of the bar in opposite directions and their ends extended laterally and formed into curved hooks.

In testimony that I claim the foregoing as my own, I have hereto affixed my signature in the presence of two witnesses.

JOHN C. JACOBY.

Witnesses:
J. C. WARRING,
ADA ELY.